United States Patent
Lee et al.

(10) Patent No.: US 7,453,229 B2
(45) Date of Patent: Nov. 18, 2008

(54) APPARATUS AND METHOD FOR CONTROLLING OPERATION OF RECIPROCATING COMPRESSOR

(75) Inventors: Chel Woong Lee, Seoul (KR); Ji-Won Sung, Seoul (KR)

(73) Assignee: LG Electronics Inc., Seoul (KR)

( * ) Notice: Subject to any disclaimer, the term of this patent is extended or adjusted under 35 U.S.C. 154(b) by 408 days.

(21) Appl. No.: 11/267,169

(22) Filed: Nov. 7, 2005

(65) Prior Publication Data
US 2006/0251523 A1 Nov. 9, 2006

(30) Foreign Application Priority Data
May 6, 2005 (KR) .................... 10-2005-0038134

(51) Int. Cl.
G05D 23/275 (2006.01)
F04B 49/12 (2006.01)
(52) U.S. Cl. .................. 318/632; 318/443; 417/44.1; 417/44.11
(58) Field of Classification Search ............. 318/119, 318/135, 632; 417/44.11, 212
See application file for complete search history.

(56) References Cited

U.S. PATENT DOCUMENTS 5,779,450 A * 7/1998 Fujiwara et al. ............. 417/45
6,074,172 A * 6/2000 Huang ....................... 417/214
6,537,034 B2 * 3/2003 Park et al. ................. 417/44.1
6,779,982 B2 * 8/2004 Heo ......................... 417/44.11
6,811,380 B2 * 11/2004 Kim ......................... 417/44.1
6,815,922 B2 * 11/2004 Yoo et al. ................... 318/632
7,001,154 B2 * 2/2006 Kim .......................... 417/212
7,271,563 B2 * 9/2007 Yoo et al. ................... 318/632
2002/0051710 A1* 5/2002 Yoo et al. ................. 417/44.11
2003/0133807 A1* 7/2003 Heo ....................... 417/44.11
2003/0161734 A1* 8/2003 Kim ......................... 417/44.1
2004/0066163 A1* 4/2004 Yoo et al. ................... 318/632
2004/0067140 A1* 4/2004 Yoo et al. .................. 417/44.1
2005/0141998 A1* 6/2005 Yoo et al. .................. 417/44.1
2006/0056979 A1* 3/2006 Yoo et al. ................. 417/44.11
2006/0056980 A1* 3/2006 Yoo et al. ................. 417/44.11
2006/0228226 A1* 10/2006 Kim et al. ................... 417/212

FOREIGN PATENT DOCUMENTS

CN 1580554 A 2/2005

* cited by examiner

Primary Examiner—Paul Ip
(74) Attorney, Agent, or Firm—Birch, Stewart, Kolasch & Birch, LLP

(57) ABSTRACT

An apparatus and method for controlling the operation of a reciprocating compressor are capable of preventing distortion of a current applied to the reciprocating compressor by generating a current amplitude value for compensating a difference value between a stroke reference value of the reciprocating compressor and a stroke estimate value and outputting the current amplitude value in a form of a sine wave to the reciprocating compressor. The apparatus for controlling an operation of a reciprocating compressor generates a current amplitude value for compensating a difference value between a stroke reference value and a stroke estimate value of the reciprocating compressor and outputs the current amplitude value in a sine wave form to the reciprocating compressor.

12 Claims, 3 Drawing Sheets

WAVEFORM OF CURRENT APPLIED TO MOTOR

APPARATUS AND METHOD FOR CONTROLLING OPERATION OF RECIPROCATING COMPRESSOR

BACKGROUND OF THE INVENTION

1. Field of the Invention

The present invention relates to a compressor and, more particularly, to an apparatus and method for controlling an operation of a reciprocating compressor.

2. Description of the Prior Art

In general, a reciprocating compressor (hereinafter, for simplicity, referred to as "reciprocating motor compressor"), which is operated by a linearly reciprocating electric motor without a crank shaft for converting a rotational motion to a linear motion, has less friction loss, and thus, can provide a higher compression efficiency than other compressors.

When the reciprocating motor compressor is used for a refrigerator or an air-conditioner, a compression ratio of the compressor can be varied to control the cooling capacity by varying a stroke voltage applied to the reciprocating motor of the compressor.

The conventional controlling of a reciprocating motor compressor will now be described with reference to FIG. 1.

FIG. 1 is a block diagram showing the construction of an apparatus for controlling an operation of a reciprocating compressor in accordance with a conventional art.

As shown in FIG. 1, the conventional apparatus for controlling an operation of a reciprocating compressor includes a current detector 6 for detecting a current applied to a motor (not shown) of a reciprocating compressor 4; a voltage detector 6 for detecting a voltage applied to the motor; a stroke calculator 7 for calculating a stroke estimate value of the reciprocating compressor based on the detected current value, the detected voltage value and a parameter of the motor; a first comparator 8 for comparing the calculated stroke estimate value and a pre-set stroke reference value, and outputting a first difference value according to the comparison result; a second comparator 1 for comparing a current operation frequency applied to the reciprocating compressor 4 and an operation frequency reference value, and outputting a second difference value according to the comparison result; a stroke controller 2 for outputting a voltage control signal used for varying the voltage applied to the motor of the compressor based on the first difference value outputted from the first comparator 8, and generating an operation frequency control signal used for varying the current operation frequency based on the second difference value outputted from the second comparator 1; and an inverter 3 for varying the current operation frequency according to the operation frequency control signal of the stroke controller 2, and varying the voltage applied to the motor according to the voltage control signal.

Herein, a mechanical resonance frequency of the reciprocating compressor is detected based on the value of the current applied to the reciprocating compressor 4 and the stroke estimate value, and the detected mechanical resonance frequency is determined as the operation frequency reference value.

The operation of the apparatus for controlling the operation of the reciprocating compressor will now be described.

First, the current detector 6 detects a current applied to the motor (not shown) of the reciprocating compressor 4 and outputs the detected current value to the stroke calculator 7. At this time, the voltage detector 5 detects a voltage applied to the motor and outputs the detected voltage value to the stroke calculator 7.

The stroke calculator 7 calculates a stroke estimate value (X) of the reciprocating compressor 4 by substituting detected current value, the detected voltage value and the parameter of the motor to equation (1) shown below, and applies the calculated stroke estimate value (X) to the first comparator 8.

$$X = \frac{1}{\alpha} \int (V_M - Ri - L\dot{i}) dt \tag{1}$$

wherein 'R' is a motor resistance value, 'L' is a motor inductance value, 'α' is a motor constant, $V_M$ is the value of the voltage applied to the motor, 'i' is the value of the current applied to the motor, and $\dot{i}$ is a time variation rate of the current applied to the motor, namely, a differential value (di/dt) of 'i'.

Thereafter, the first comparator 8 compares the stroke estimate value and the stroke reference value and applies a first difference value according to the comparison result to the stroke controller 2.

Meanwhile, the second comparator 1 compares the current operation frequency and an operation frequency reference value and applies a second difference value according to the comparison result to the stroke controller 2.

The stroke controller 2 outputs a voltage control signal used for varying the voltage applied to the motor of the reciprocating compressor based on the first difference value outputted from the first comparator 8 to the inverter 3, and outputs an operation frequency control signal used for varying the current operation frequency based on the second difference value outputted from the second comparator 1 to the inverter 3.

The inverter 3 varies the current operation frequency according to the operation frequency control signal and varies the voltage applied to the motor according to the voltage control signal.

FIG. 2 is a graph showing a waveform of a current applied to the motor of the reciprocating compressor when the reciprocating compressor is controlled by using the apparatus for controlling the operation of the reciprocating compressor in accordance with the conventional art.

As shown in FIG. 2, when the voltage inputted to the apparatus for controlling the operation of the reciprocating compressor is low or when a load is changed, the waveform of the current applied to the motor of the reciprocating compressor is severely distorted.

For example, the conventional apparatus for controlling the operation of the reciprocating compressor controls the voltage applied to the reciprocating compressor and does not control the waveform of the current passing through the reciprocating compressor. Therefore, when the voltage inputted to the apparatus for controlling the operation of the reciprocating compressor is low or when a load is changed, the waveform of the current applied to the motor of the reciprocating compressor is severely distorted. In addition, since the waveform of the current applied to the motor of the reciprocating compressor is not a sine wave (because the current waveform is distorted), when the mechanical resonance frequency of the reciprocating compressor is detected based on the value of the current applied to the reciprocating compressor and the stroke estimate value, an error is generated and efficiency of the reciprocating compressor is degraded due to a harmonic component of the current applied to the reciprocating compressor.

As mentioned above, the conventional apparatus for controlling the operation of the reciprocating compressor has the following problems.

That is, when the voltage in putted to the apparatus for controlling the operation of the reciprocating compressor is low or when a load is changed, the waveform of the current applied to the motor of the reciprocating compressor is severely distorted. Accordingly, when the mechanical resonance frequency of the reciprocating compressor is detected based on the value of the current applied to the reciprocating compressor and the stroke estimate value, an error is generated and efficiency of the reciprocating compressor is degraded due to a harmonic component of the current applied to the reciprocating compressor.

BRIEF DESCRIPTION OF THE INVENTION

Therefore, one object of the present invention is to provide an apparatus and method for controlling the operation of a reciprocating compressor capable of preventing distortion of a current applied to the reciprocating compressor by generating a current amplitude value for compensating a difference value between a stroke reference value of the reciprocating compressor and a stroke estimate value and outputting the current amplitude value in a form of a sine wave to the reciprocating compressor.

Another object of the present invention is to provide an apparatus and method for controlling an operation of a reciprocating compressor capable of precisely detecting a mechanical resonance frequency of the reciprocating compressor based on a value of a current applied to the reciprocating compressor and a stroke estimate value by preventing distortion of the current applied to the reciprocating compressor.

Still another object of the present invention is to provide an apparatus and method for controlling an operation of a reciprocating compressor capable of degradation of efficiency due to a harmonic component of a current applied to the reciprocating compressor by preventing distortion of the current applied to the reciprocating compressor.

To achieve these and other advantages and in accordance with the purpose of the present invention, as embodied and broadly described herein, there is provided an apparatus for controlling an operation of a reciprocating compressor, which generates a current amplitude value for compensating a difference value between a stroke reference value and a stroke estimate value of the reciprocating compressor and outputs the current amplitude value in a sine wave form to the reciprocating compressor.

To achieve the above object, there is also provided an apparatus for controlling an operation of a reciprocating compressor including: a current detector for detecting a current applied to a motor of a reciprocating compressor; a voltage detector for detecting a voltage applied to the motor; a stroke calculator for calculating a stroke estimate value of the reciprocating compressor based on the detected current value, the detected voltage value and a parameter of the motor; a first comparator for comparing the calculated stroke estimate value and a pre-set stroke reference value, and outputting a first difference value according to the comparison result; a current amplitude value generator for generating a current amplitude value for compensating the first difference value and outputting the current amplitude value in a sine wave form; a current controller for comparing the current amplitude value and the detected current value and generating a pulse width modulation signal used for compensating a second difference value according to the comparison result; and an inverter for varying an amplitude of the current to be applied to the motor according to the pulse width modulation signal.

To achieve the above object, there is also provided an apparatus for controlling an operation of a reciprocating compressor including: a current detector for detecting a current applied to a motor of a reciprocating compressor; a voltage detector for detecting a voltage applied to the motor; a stroke calculator for calculating a stroke estimate value of the reciprocating compressor based on the detected current value, the detected voltage value and a parameter of the motor; a first comparator for comparing the calculated stroke estimate value and a pre-set stroke reference value, and outputting a first difference value according to the comparison result; a first proportional integral (PI) controller for generating a current amplitude value for compensating the first difference value by performing proportional-integral controlling based on the first difference value; a controller for reading a previously stored current sine table value corresponding to the current amplitude value from a storage unit, and generating a current amplitude value having a sine wave based on the read sine table value; a second comparator for comparing the current amplitude value having the sine wave and the detected current value, and outputting a second difference value according to the comparison result; a second PI controller for performing proportional-integral controlling based on the second difference value outputted form the second comparator and applying a pulse width modulation signal used for compensating the second difference value to an inverter; and the inverter for varying amplitude of a current to be applied to the motor according to the pulse width modulation signal, wherein the controller outputs the current amplitude value having the sine wave by synchronizing a current waveform corresponding to the current amplitude value with an operation frequency corresponding to an operation frequency reference value.

To achieve the above object, there is also provided a method for controlling an operation of a reciprocating compressor including: generating a current value for compensating a difference value between a stroke reference value of the reciprocating compressor and a stroke estimate value; and outputting the current value in a sine wave form to the reciprocating compressor.

To achieve the above object, there is also provided a method for controlling an operation of a reciprocating compressor including: detecting a current applied to a motor of a reciprocating compressor; detecting a voltage applied to the motor; calculating a stroke estimate value of the reciprocating compressor based on the detected current value, the detected voltage value and a parameter of the motor; comparing the calculated stroke estimate value and a pre-set stroke reference value and outputting a first difference value according to the comparison result; generating a current amplitude value for compensating the first difference value and outputting the current amplitude value in a sine wave form; comparing the current amplitude value and the detected current value and generating a pulse width modulation signal used for compensating a second difference value according to comparison result; and varying amplitude of a current to be applied to the motor according to the pulse width modulation signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
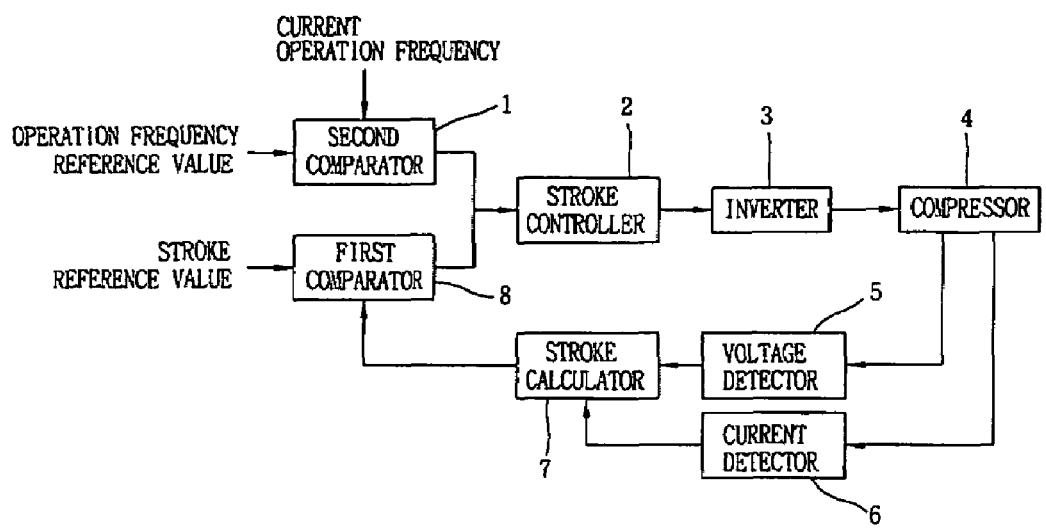
FIG. 1 is a block diagram showing the construction of an apparatus for controlling an operation of a reciprocating compressor in accordance with a conventional art.
Figure 2:
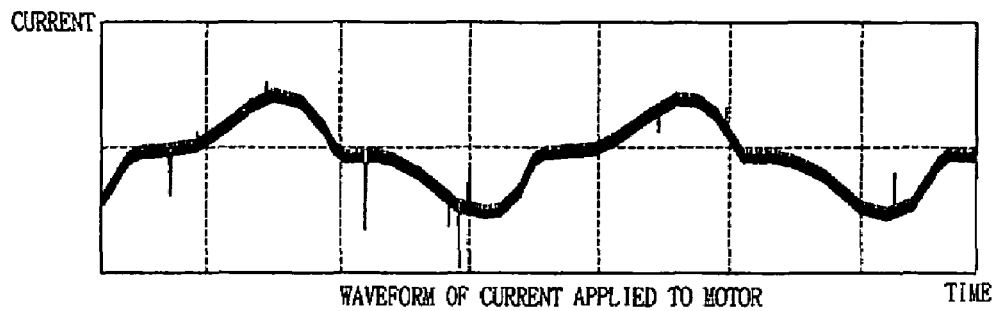
FIG. 2 shows a waveform of a current applied to a motor of the reciprocating compressor when the reciprocating compressor is controlled by using the apparatus for controlling the operation of the reciprocating compressor in accordance with the conventional art.
Figure 3:
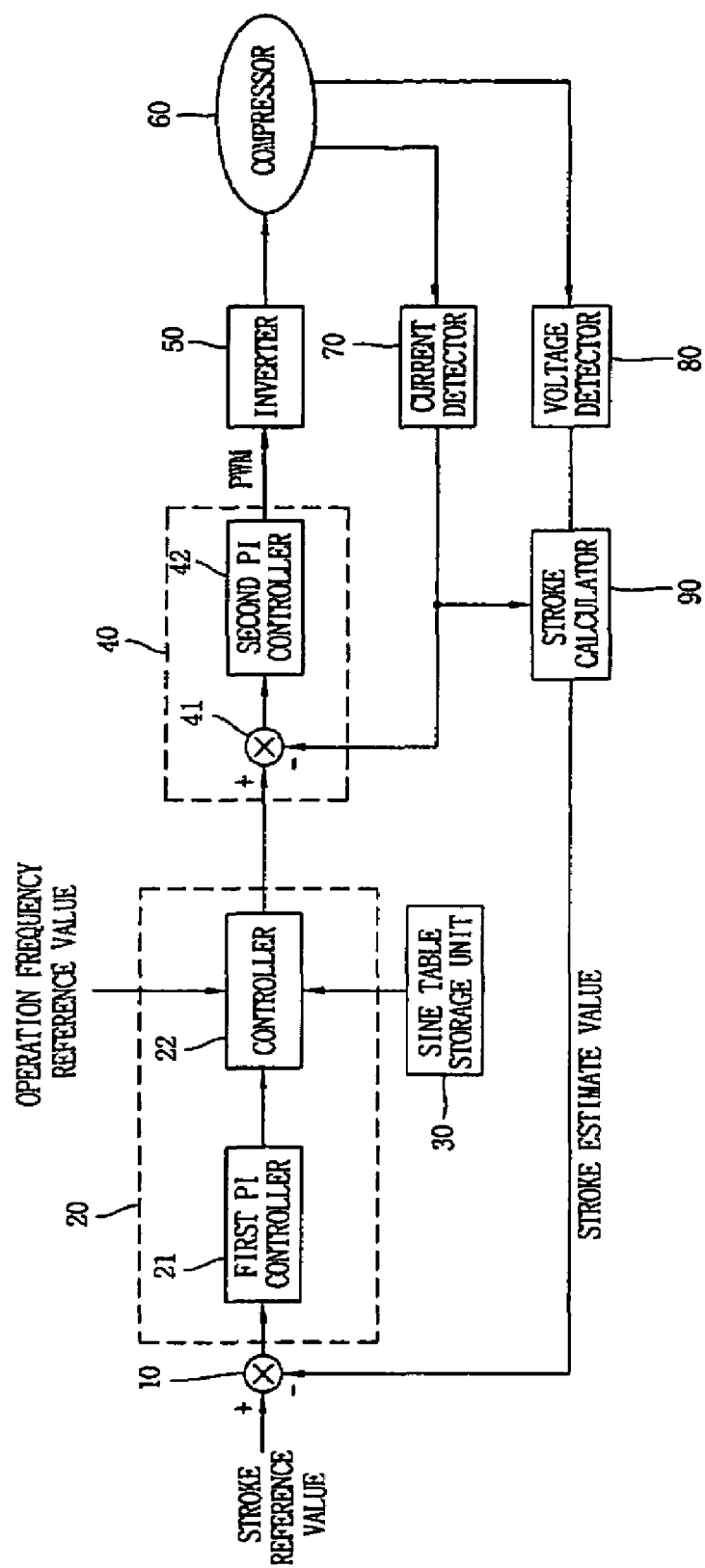
FIG. 3 is a block diagram showing an apparatus for controlling an operation of a reciprocating compressor in accordance with the present invention.
Figure 4:
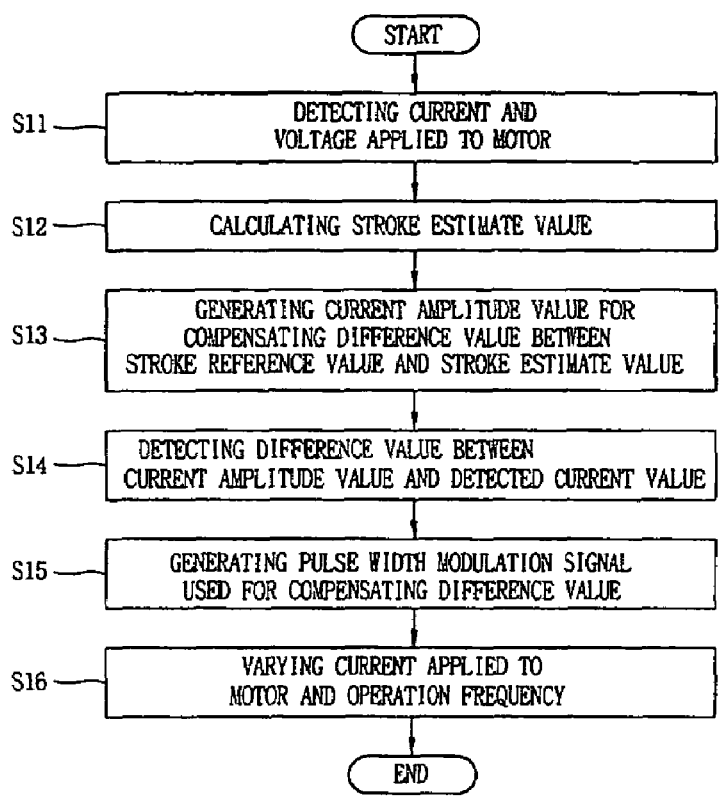
FIG. 4 is a flow chart of a method for controlling the operation of the reciprocating compressor in accordance with the present invention.
Figure 5:
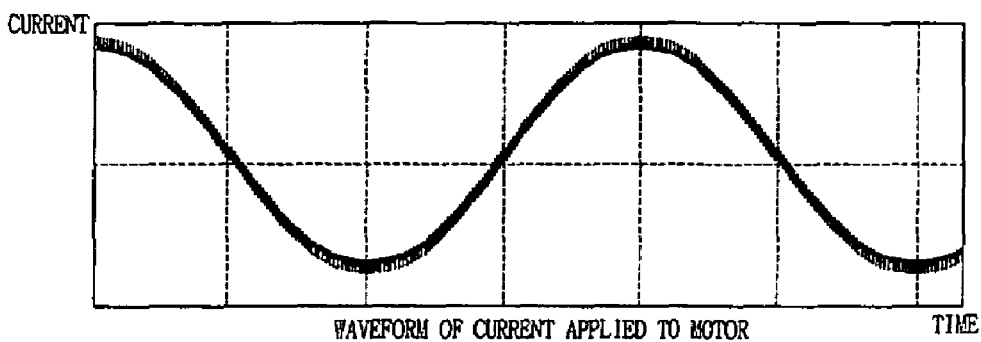
FIG. 5 shows a waveform of a current applied to a motor of the reciprocating compressor when the reciprocating compressor is controlled by using the apparatus for controlling the operation of the reciprocating compressor in accordance with the present invention.

The apparatus and method for controlling the operation of a reciprocating compressor capable of preventing distortion of a current applied to the reciprocating compressor by generating a current amplitude value for compensating a difference value between a stroke reference value of the reciprocating compressor and a stroke estimate value and outputting the current amplitude value in a form of a sine wave to the reciprocating compressor in accordance with the present invention will be described with reference to FIGS. 3 to 5.

FIG. 3 is a block diagram showing an apparatus for controlling an operation of a reciprocating compressor in accordance with the present invention. As shown in FIG. 3, the apparatus for controlling an operation of a reciprocating compressor includes a current detector 70 for detecting a current applied to a motor of a reciprocating compressor 60; a voltage detector 80 for detecting a voltage applied to the motor; a stroke calculator 90 for calculating a stroke estimate value of the reciprocating compressor 60 based on the detected current value, the detected voltage value and a parameter of the motor; a first comparator 10 for comparing the calculated stroke estimate value and a pre-set stroke reference value, and outputting a difference value according to the comparison result; a current amplitude value generator 20 for generating a current amplitude value for compensating the difference value of the first comparator 10 and outputting the current amplitude value according to an operation frequency reference value; a current controller 40 for comparing the current amplitude value and the current value which has been detected by the current detector 70 and generating a pulse width modulation signal used for compensating a difference value according to the comparison result; and an inverter 50 for varying an amplitude of the current to be applied to the motor according to the pulse width modulation signal outputted from the current controller 40. Herein, a mechanical resonance frequency of the reciprocating compressor 60 is detected based on the value of the current applied to the reciprocating compressor 60 and the stroke estimate value, and the detected mechanical resonance frequency is determined as the operation frequency reference value.

Meanwhile, the method for generating the current amplitude value for compensating the difference value between the stroke reference value of the reciprocating compressor 60 and the stroke estimate value and outputting the current amplitude value in a sine wave form to the reciprocating compressor can be variably implemented by a person with an ordinary skill in the art based on the technical idea of the present invention. Thus, a preferred embodiment of the apparatus for controlling the operation of the reciprocating compressor will be described in detail with reference to FIGS. 3 and 4 as follows.

FIG. 4 is a flow chart of a method for controlling the operation of the reciprocating compressor in accordance with the present invention.

First, the current detector 70 detects a current applied to the motor of the reciprocating compressor 60 and applies the detected current value to the stroke calculator 90. At this time, the voltage detector 80 detects a voltage applied to the motor and applies the detected voltage value to the stroke calculator 90 (step S11).

The stroke calculator 90 calculates a stroke estimate value based on the detected voltage value, the detected current value and a parameter of the motor, and outputs the calculated stroke estimate value to the first comparator 10 (step S12).

The first comparator 10 compares the stroke estimate value with a pre-set stroke reference value and applies a difference value according to the comparison result to the current amplitude value generator 20.

The current amplitude value generator 20 generates a current amplitude value for compensating the difference value outputted from the first comparator 10 and outputs the generated current amplitude value to the current controller 40. For example, a first proportional integral (PI) controller 21 of the current amplitude value generator 20 performs proportional-integral controlling based on the difference value outputted from the first comparator 10 to generate the current amplitude value for compensating the difference value, and outputs the current amplitude value to a controller 22.

The controller 22 of the current amplitude value generator 20 generates a current amplitude value having a sine wave by using the current amplitude value outputted from the first PI controller 21 and sine table values previously stored in a sine table storage unit 30. For example, the controller 22 of the current amplitude value generator 20 reads a sine table value of the current corresponding to the current amplitude value from the sine table storage unit 30 and generates the current amplitude value having the sine wave based on the read sine table value (step S13). Herein, the sine table storage unit 30 previously stores current amplitude values previously set through several experimentations in the form of the sine table. At this time, preferably, the controller 2 outputs the current amplitude value by synchronizing a current waveform corresponding to the current amplitude value with an operation frequency corresponding to the operation frequency reference value.

Thereafter, the current controller 40 compares the current amplitude value outputted from the controller 22 and the current value detected by the current detector 70, detects a difference value according to the comparison result (step S14), generates a pulse width modulation signal used for compensating the difference value, and applies the generated pulse width modulation signal to the inverter 50.

For example, a second comparator 41 of the current controller 40 compares the current amplitude value having the sine wave with the detected current value, and outputs the difference value according to the comparison result to a second PI controller 42.

The PI controller 42 of the current controller 40 performs proportional-integral controlling based on the difference value outputted from the second comparator 41 and applies the pulse width modulation signal used for compensating the difference value to the inverter 50. At this time, the wave form of the current applied to the motor is a sine wave (step S15).

The inverter 50 varies amplitude of the current applied to the motor according to the pulse width modulation signal outputted from the current controller 40 and the operation frequency (step S16). Namely, referring back to the conventional apparatus for controlling the operation of the reciprocating compressor, because it does not control the waveform of the current passing through the reciprocating compressor, when an inputted voltage is low or when a load is changed, the waveform of the current applied to the reciprocating compressor is severely distorted. In comparison, however, in the present invention, the current value for compensating the difference value between the stroke reference value and the stroke estimate value is outputted in the sine wave form and the pulse width modulation signal used for compensating the difference value between the current value in the sine wave form and the value of the current applied to the reciprocating compressor is applied to the inverter, so that when the voltage inputted to the apparatus for controlling the operation of the reciprocating compressor is low or when a load is changed, the waveform of the current applied to the motor of the reciprocating compressor can be maintained. Therefore, when a mechanical resonance frequency of the reciprocating compressor is detected based on the value of the current applied to the reciprocating compressor and the stroke estimate value, an error does not occur and degradation of efficiency of the reciprocating compressor due to the harmonic component of the current applied to the reciprocating compressor does not occur.

FIG. 5 shows a waveform of a current applied to a motor of the reciprocating compressor when the reciprocating compressor is controlled by using the apparatus for controlling the operation of the reciprocating compressor in accordance with the present invention.

As shown in FIG. 5, even when the voltage inputted to the apparatus for controlling the operation of the reciprocating compressor is low or even when a load is changed, the waveform of the current applied to the motor of the reciprocating compressor is not distorted.

As so far described, the apparatus and method for controlling the operation of the reciprocating compressor have many advantages.

That is, for example, first, because the current amplitude value for compensating the difference value between the stroke reference value and the stroke estimate value of the reciprocating compressor is generated and outputted in the sine form to the reciprocating compressor, when the voltage inputted to the apparatus for controlling the operation of the reciprocating compressor is low or when a load is changed, distortion of the current applied to the reciprocating compressor can be prevented.

Second, since the distortion of the current applied to the reciprocating compressor is prevented, the mechanical resonance frequency of the reciprocating compressor can be precisely detected based on the value of the current applied to the reciprocating compressor and the stroke estimate value.

Third, since the distortion of the current applied to the reciprocating compressor, degradation of efficiency due to the harmonic component of the current applied to the reciprocating compressor can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for controlling an operation of a reciprocating compressor, comprising:
    a first comparator for comparing the stroke estimate value and a pre-set stroke reference value, and outputting a first difference value according to the comparison result;
    a current amplitude value generator for generating a current amplitude value for compensating the first difference value and outputting the current amplitude value in a sine wave form;
    a current controller for comparing the current amplitude value and the value of the current applied to the reciprocating compressor and generating a pulse width modulation signal used for compensating a second difference value according to the comparison result; and
    an inverter for varying amplitude of the current to be applied to the motor according to the pulse width modulation signal.

2. An apparatus for controlling an operation of a reciprocating compressor comprising:
    a current detector for detecting a current applied to a motor of a reciprocating compressor;
    a voltage detector for detecting a voltage applied to the motor;
    a stroke calculator for calculating a stroke estimate value of the reciprocating compressor based on the detected current value, the detected voltage value and a parameter of the motor;
    a first comparator for comparing the calculated stroke estimate value and a pre-set stroke reference value, and outputting a first difference value according to the comparison result;
    a current amplitude value generator for generating a current amplitude value for compensating the first difference value and outputting the current amplitude value in a sine wave form;
    a current controller for comparing the current amplitude value and the detected current value and generating a pulse width modulation signal used for compensating a second difference value according to the comparison result; and
    an inverter for varying amplitude of the current to be applied to the motor according to the pulse width modulation signal.

3. The apparatus of claim 2, wherein the current amplitude value generator comprises:
    a first proportional integral (PI) controller for generating the current amplitude value for compensating the first difference value by performing the proportional integral controlling based on the first difference value outputted from the first comparator; and
    a controller for reading a sine table value corresponding to the current amplitude value outputted from the first PI controller from a storage unit, and generating a current amplitude value having a sine wave based on the read sine table value.

4. The apparatus of claim 3, wherein the controller outputs the current amplitude value by synchronizing the current waveform corresponding to the current amplitude value with an operation frequency corresponding to an operation frequency reference value.

5. The apparatus of claim 3, wherein the current controller comprises:
a second comparator for comparing the current amplitude value having the sine wave and the detected current value and outputting a second difference value according to the comparison result; and
a second PI controller for performing a proportional integral controlling based on the second difference value outputted from the second comparator and applying a pulse width modulation signal used for compensating the second difference value to the inverter.

6. An apparatus for controlling an operation of a reciprocating compressor comprising:
a current detector for detecting a current applied to a motor of a reciprocating compressor;
a voltage detector for detecting a voltage applied to the motor;
a stroke calculator for calculating a stroke estimate value of the reciprocating compressor based on the detected current value, the detected voltage value and a parameter of the motor;
a first comparator for comparing the calculated stroke estimate value and a pre-set stroke reference value, and outputting a first difference value according to the comparison result;
a first proportional integral (PI) controller for generating a current amplitude value for compensating the first difference value by performing proportional-integral controlling based on the first difference value;
a controller for reading a previously stored current sine table value corresponding to the current amplitude value from a storage unit, and generating a current amplitude value having a sine wave based on the read sine table value;
a second comparator for comparing the current amplitude value having the sine wave and the detected current value, and outputting a second difference value according to the comparison result;
a second PI controller for performing proportional-integral controlling based on the second difference value outputted form the second comparator and applying a pulse width modulation signal used for compensating the second difference value to an inverter; and
the inverter for varying amplitude of a current to be applied to the motor according to the pulse width modulation signal,
wherein the controller outputs the current amplitude value having the sine wave by synchronizing a current waveform corresponding to the current amplitude value with an operation frequency corresponding to an operation frequency reference value.

7. The apparatus of claim 6, wherein the operation frequency reference value is a mechanical resonance frequency of the reciprocating compressor detected based on the value of the current applied to the motor and the stroke estimate value.

8. A method for controlling an operation of a reciprocating compressor comprising:
generating a first current value for compensating a difference value between a stroke reference value of the reciprocating compressor and a stroke estimate value; and
outputting the first current value in a sine wave form to the reciprocating compressor,
wherein the step of generating the first current value comprises:
comparing the stroke estimate value and the pre-set stroke reference value and outputting a first difference value according to the comparison result;
outputting the first current value for compensating the first difference value in the sine wave form;
comparing the first current value and a second current value of the current applied to the reciprocating compressor and generating a pulse width modulation signal used for compensating the second difference value according to the comparison result; and
varying the current to be applied to the reciprocating compressor according to the pulse with modulation signal.

9. A method for controlling an operation of a reciprocating compressor comprising:
detecting a current applied to a motor of a reciprocating compressor;
detecting a voltage applied to the motor;
calculating a stroke estimate value of the reciprocating compressor based on the detected current value, the detected voltage value and a parameter of the motor;
comparing the calculated stroke estimate value and a pre-set stroke reference value and outputting a first difference value according to the comparison result;
generating a current amplitude value for compensating the first difference value and outputting the current amplitude value in a sine wave form;
comparing the current amplitude value and the detected current value and generating a pulse width modulation signal used for compensating a second difference value according to comparison result; and
varying amplitude of a current to be applied to the motor according to the pulse width modulation signal.

10. The method of claim 9, wherein the step of outputting the current amplitude value in the sine wave form comprises:
performing proportional integral controlling based on the first difference value to generate the current amplitude value for compensating the first difference value; and
reading a previously stored sine table value corresponding to the current amplitude value and outputting the current amplitude value having the sine wave based on the read sine table value.

11. The method of claim 10, wherein, in the step of outputting the current amplitude value having the sine wave, the current amplitude value is outputted by synchronizing the current waveform corresponding to the current amplitude value with the operation frequency corresponding to the operation frequency reference value.

12. The method of claim 11, wherein the step of generating the pulse width modulation signal comprises:
comparing the current amplitude value having the sine wave and the detected current value and outputting the second difference value according to the comparison result; and
generating the pulse width modulation signal used for compensating the second difference value by performing proportional integral controlling based on the second difference value.

* * * * *